(12) United States Patent
Wirth, Jr. et al.

(10) Patent No.: US 6,244,793 B1
(45) Date of Patent: Jun. 12, 2001

(54) HINGE DRILLING ATTACHMENT

(75) Inventors: John Wirth, Jr., Dubois; Jay L. Sanger, Casper; Paul Brutsman, Casper; Mark K. McCool, Casper, all of WY (US)

(73) Assignee: Woodworker's Supply, Inc., Casper, WY (US)

( * ) Notice: Subject to any disclaimer, the term of this patent is extended or adjusted under 35 U.S.C. 154(b) by 0 days.

(21) Appl. No.: 09/398,018

(22) Filed: Sep. 17, 1999

(51) Int. Cl.$^7$ ........................................... B23B 39/16
(52) U.S. Cl. ...................... 408/42; 408/53; 408/234; 408/241 R
(58) Field of Search ................. 408/42, 51, 53, 408/95, 98, 241 R, 241 G, 234

(56) References Cited

U.S. PATENT DOCUMENTS

| | | | |
|---|---|---|---|
| 3,389,729 | * | 6/1968 | Macala .................................. 408/53 |
| 4,290,717 | * | 9/1981 | Aslen ................................ 408/241 G |
| 4,552,494 | * | 11/1985 | Wix .................................. 408/241 G |
| 4,609,310 | * | 9/1986 | Blum ....................................... 408/53 |
| 5,085,543 | * | 2/1992 | Click ...................................... 408/51 |
| 5,217,331 | * | 6/1993 | Ericksen ................................ 408/42 |
| 5,419,662 | * | 5/1995 | Ericksen ................................ 408/42 |

FOREIGN PATENT DOCUMENTS

| | | | |
|---|---|---|---|
| 568432 | * | 4/1945 | (GB) ............................... 408/241 G |
| 571794 | * | 9/1945 | (GB) ............................... 408/241 G |

* cited by examiner

*Primary Examiner*—Steven C. Bishop
(74) *Attorney, Agent, or Firm*—Nixon & Vanderhye PC

(57) ABSTRACT

An attachment that allows a drilling machine, such as a drill press, to simultaneously bore the plurality of holes required for mounting a hardware component to a workpiece. In an exemplary embodiment, the attachment is adapted to simultaneously bore, in a desired disposition, all three holes needed to mount European style hinges in a single stroke. The hinge boring attachment includes a drilling head, which attaches to the chuck of the drilling machine. The drilling head rotatably supports a plurality of boring bit mounting shafts, corresponding to the number of holes to be drilled and interconnected with drive trains for translating the rotation of a center shaft, attached to the chuck of the drilling machine, to all shafts. A stabilizing arm is further preferably provided to clamp the drilling head to the support post of the drill press and roll smoothly along the support post during the drilling operation.

10 Claims, 9 Drawing Sheets

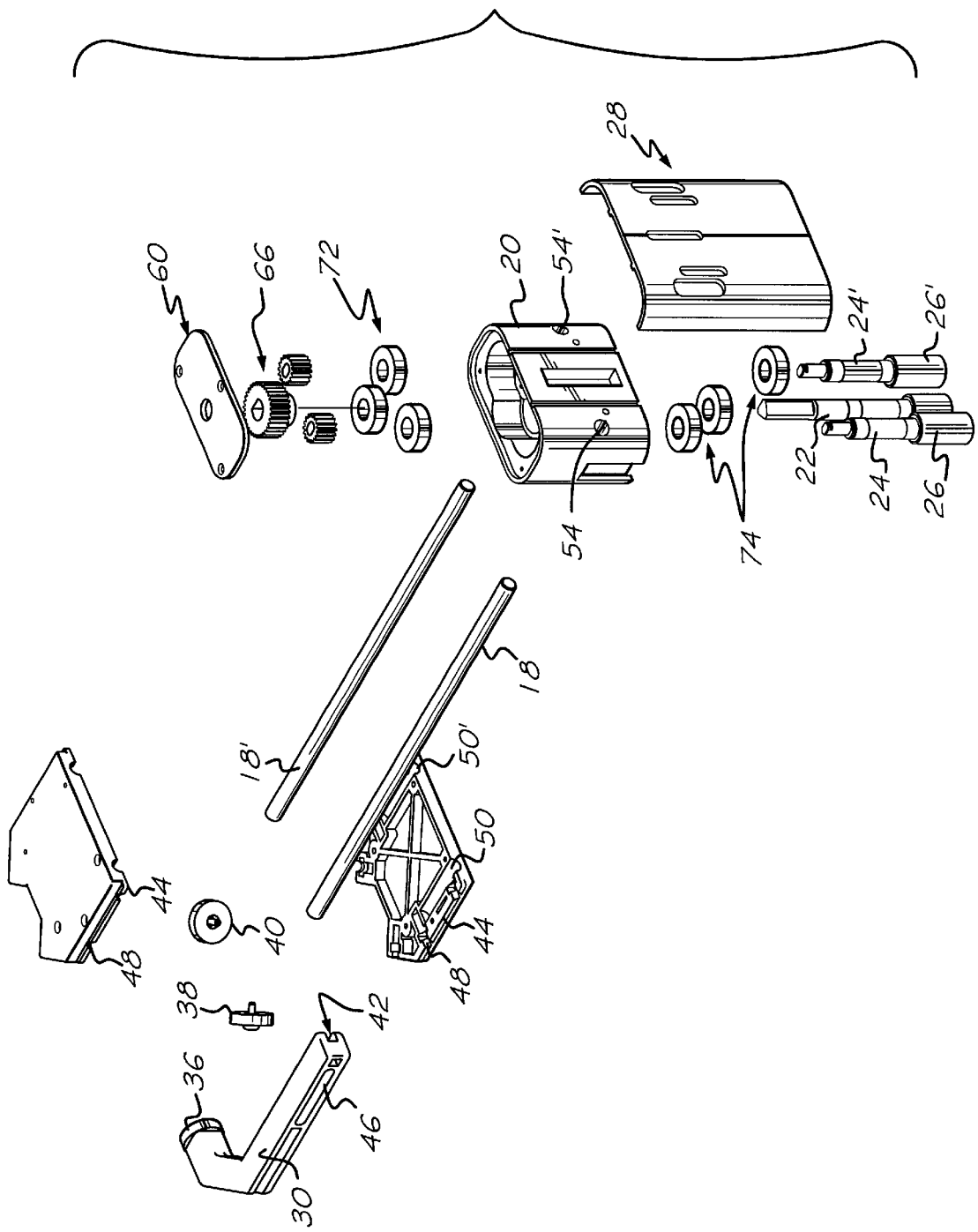

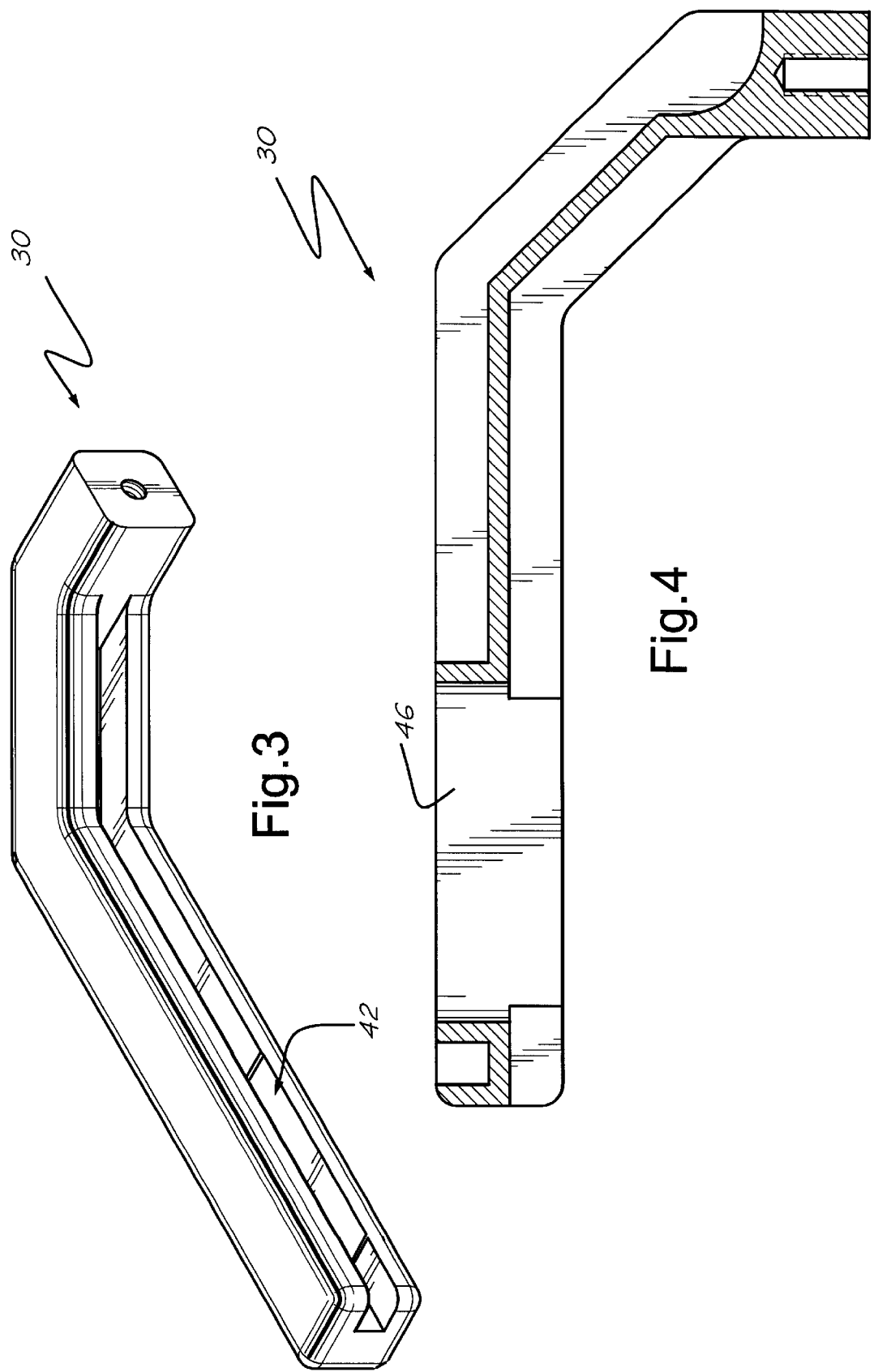

HINGE DRILLING ATTACHMENT

BACKGROUND OF THE INVENTION

1. Field of the Invention

The present invention relates to a drilling apparatus and, more particularly, to an attachment for a drilling machine that allows the simultaneous boring of the plurality of holes, in particular a plurality of holes needed to mount a hinge.

2. Description of the Related Art

Most hardware components require that a plurality of holes be pre-drilled to accommodate parts of the hardware, dowels, mounting screws and the like. Because precise relative placement of these bores is required for the hardware to function properly, a variety of drill jigs and templates have been created to aid the home hobbyist, in particular. While drill jigs are faster and easier to use than marking the workpiece with a template, the drilling process remains time consuming and the sequential drilling of holes risks shifting of the template or jig and hence improper positioning of the various bores.

SUMMARY OF THE INVENTION

The present invention provides an attachment that allows a drilling machine to simultaneously bore the plurality of holes required for mounting a hardware component to a workpiece. In an exemplary embodiment, the attachment is adapted to simultaneously bore, in a desired disposition, all three holes needed to mount European style hinges in a single stroke. The hinge boring attachment includes a drilling head, which attaches to the chuck of the drilling machine. In a preferred embodiment, the attachment is adapted for mounting to a drill press. Thus, a stabilizing arm is further preferably provided to clamp to the support post of the drill press and roll smoothly along the support post during the drilling operation.

BRIEF DESCRIPTION OF THE DRAWINGS

These, as well as other objects and advantages of this invention, will be more completely understood and appreciated by careful study of the following more detailed description of the presently preferred exemplary embodiments of the invention taken in conjunction with the accompanying drawings, in which:

FIG. 2 is an exploded perspective view from the left and above of a drill attachment of FIG. 1;

FIG. 3 is perspective view of a drill post brace arm provided in accordance with the present invention;

FIG. 4 is a cross section view of the post-brace arm of FIG. 3;

DETAILED DESCRIPTION OF THE PRESENTLY PREFERRED EXEMPLARY EMBODIMENT

Figure 1:
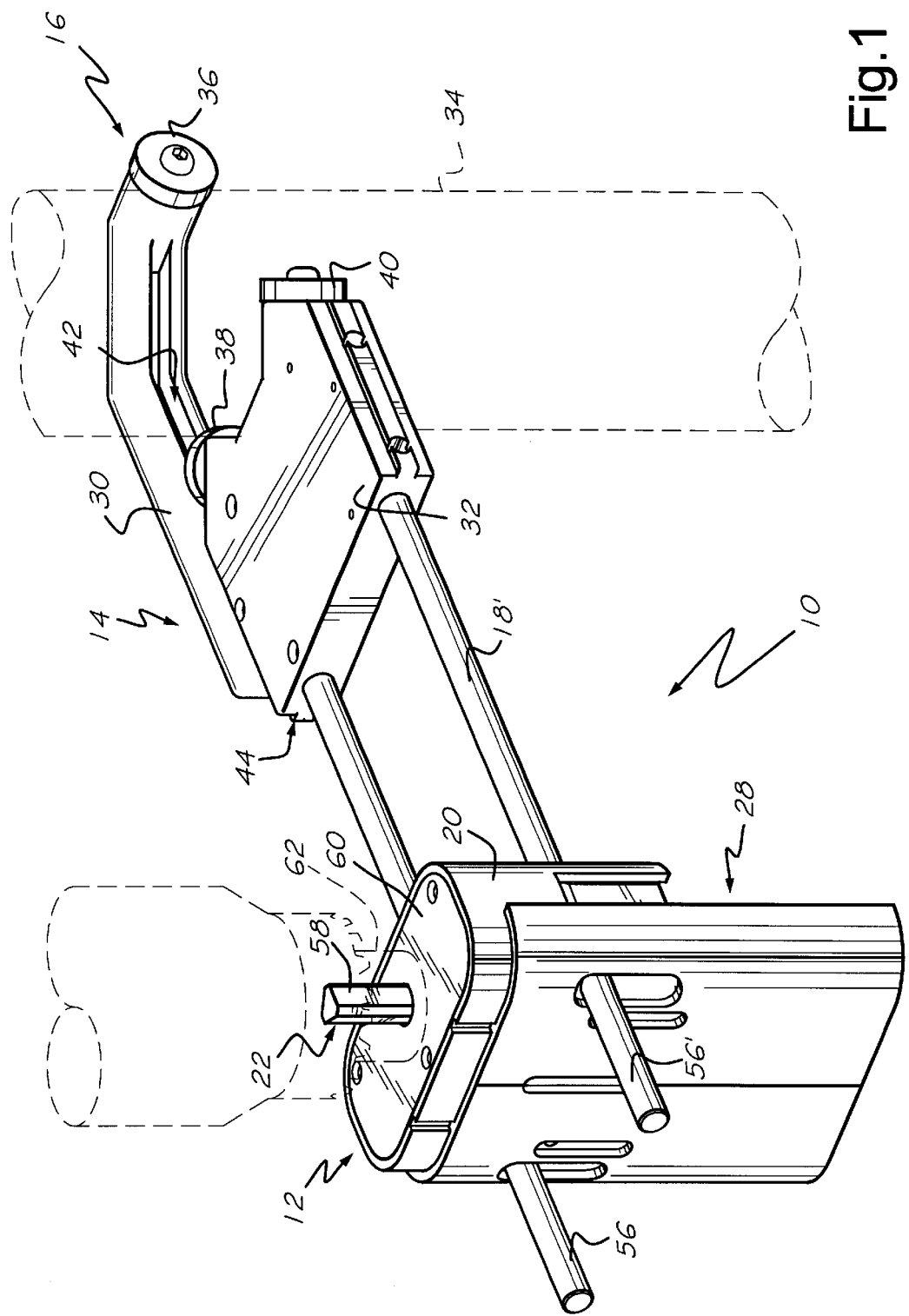
FIG. 1 is a perspective view from the right and above of a drill attachment provided in accordance with an exemplary embodiment of the invention, with drill bits omitted for clarity.
Figure 6:
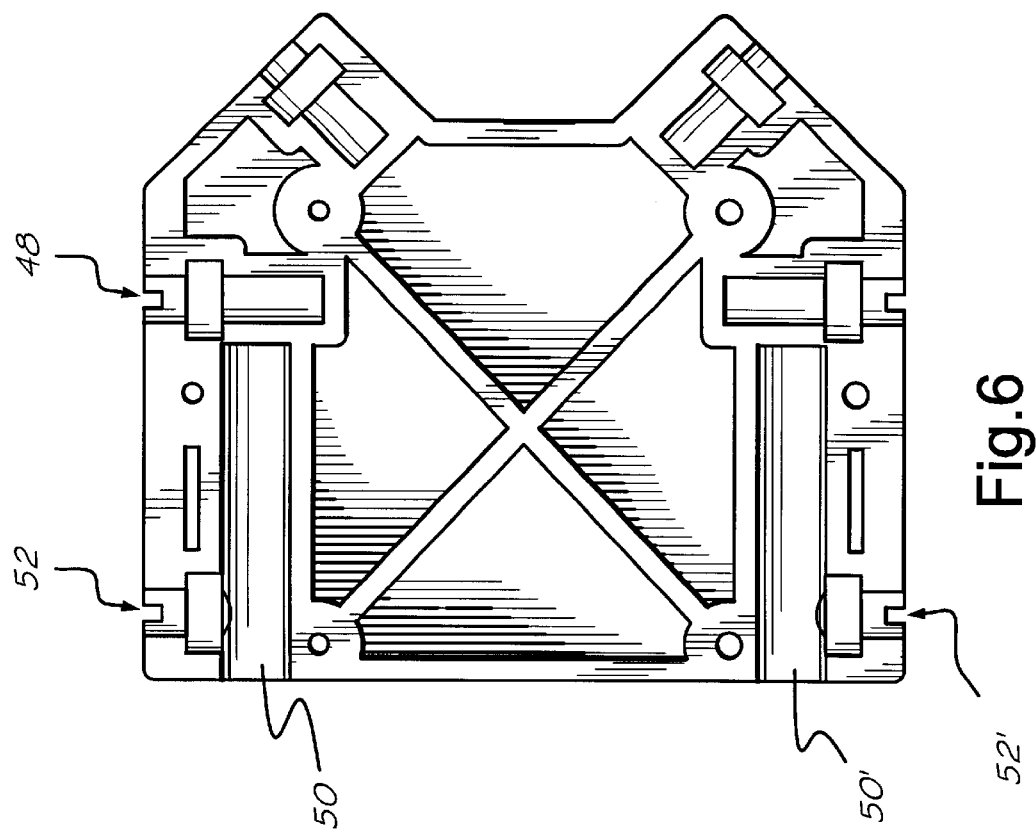
FIG. 6 is a plan view of the inner surface of the support bracket body half of FIG. 5.
Figure 5:
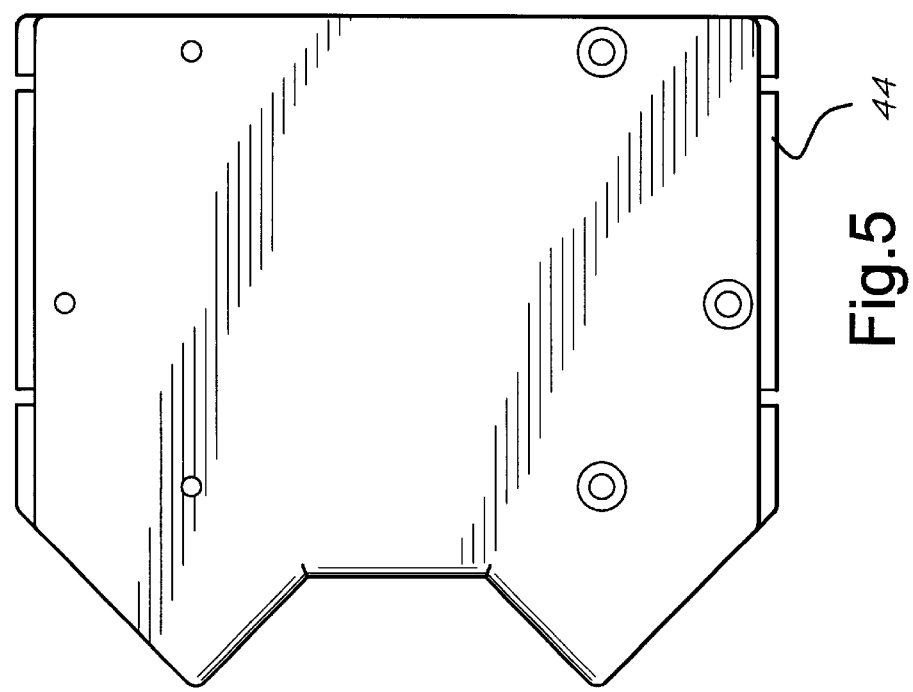
FIG. 5 is a plan view of the outer surface of one half of a support bracket body provided in accordance with an exemplary embodiment of the invention.

It is an objective of the invention to provide a drilling machine attachment that allows the drilling machine to simultaneously bore the plurality of holes needed to mount a hardware component. In an exemplary, presently preferred embodiment, the invention is embodied in an attachment for a drill press for simultaneously boring all three holes needed to mount European style hinges, e.g., 7/64" screw, 5 mm Euro screw, and/or 8 mm doweled hinges. Thus, the drilling attachment 10 in the illustrated embodiment includes a drilling head 12 and a stabilizing arm 14 including a clamping bracket 16 and stabilizer bars 18, 18', which couple the clamping bracket 16 to the drilling head 12. The drilling head 12 includes a drill body 20, a center shaft 22 for being fit into the chuck of the drilling machine, such as the drill press, and at least one and preferably first and second outer shafts 24, 24' having bushings 26, 26' for a pair of drill bits (not shown). In the illustrated embodiment, the drilling head 12 has its own adjustable chip guard/stop 28, discussed in greater detail hereinbelow.

Referring now to FIGS. 3–6 in conjunction with FIGS. 1 and 2, the clamping bracket 16 provided in accordance with the invention will be described in greater detail. The clamping bracket 16 is composed of a drill post brace arm 30 and a support bracket body 32 which are disposed to capture the drill press shaft or post (shown in phantom at 34) therebetween. In the illustrated embodiment, the drill post brace arm 30 has a wheel 36 mounted at one end thereof for engaging and rolling smoothly along the drill press shaft or post 34. The support bracket body 32 similarly has first and second wheels 38, 40 rotatably mounted thereto, also for engaging and rolling smoothly along the drill press post 34. In the illustrated embodiment, the three wheels are disposed so as to be approximately 120° apart about the circumference of the drill post. In this manner, the three rollers or wheels ride along the drill press shaft to keep the drilling head 12 true and straight.

The drill post brace arm 30 may be displaced relative to the support bracket body 32 so as to clamp to and release the drill post 34 during attachment and detachment of the hinge boring attachment 10. Thus, in the illustrated embodiment, the brace arm 30 includes a groove 42 for slidably receiving a corresponding projection 44 along the longitudinal side edge of the support bracket body 32. A set screw or the like (not shown) extends through a slot 46 defined in the brace arm 30 and is received in a corresponding bore 48 of the support bracket body 32. Thus, by loosening the set screw (not shown), the brace arm 30 can be displaced longitudinally relative to the support bracket body 32 so as to space wheel 36 from the support bracket body 32 and allow the clamping bracket 16 to be disengaged from the drill post 34. As is also evident from the illustrated embodiment, the brace arm 30 can be mounted to either the left or right side of the support bracket body 32 as desired by the consumer.

The stabilizer bars 18, 18' which project longitudinally from the support bracket body 32 are received in stabilizer bar receptacle bores 50, 50' defined in the support bracket body 32 and fixedly secured therein with suitable set screws (not shown) disposed in bores shown, e.g., at 52, 52'. The opposite longitudinal ends of the stabilizer bars 18 are disposed in stabilizer bar bores 54, 54' defined in the drill body 20 and project from the front face of the drilling head 12. In the illustrated embodiment, the free ends 56, 56' of the stabilizer bars 18, 18' determine the fully deployed position of the safety chip guard/stop 28, as shown in FIG. 1.

A center shaft 22 and first and second outer shafts 24, 24' are rotatably mounted to the drill body 20. The center shaft 22 includes one end 58 adapted to project upwardly from the drill body 20, through the drill body cover 60 for being fed into the drill press chuck (shown in phantom at 62) and rotated thereby. The other end of the center shaft 22 comprises a bushing 64 for receiving a boring bit for boring the Euro-hinge hole, e.g., a 35 mm×57 mm CT (10 mm diameter shank) boring bit. A driving gear 66 is mounted to the shaped end 58 of center shaft 22 (FIG. 2) for translating rotation of the center shaft 22 to the outer shafts 24, 24' as described hereinbelow.

Figure 14:
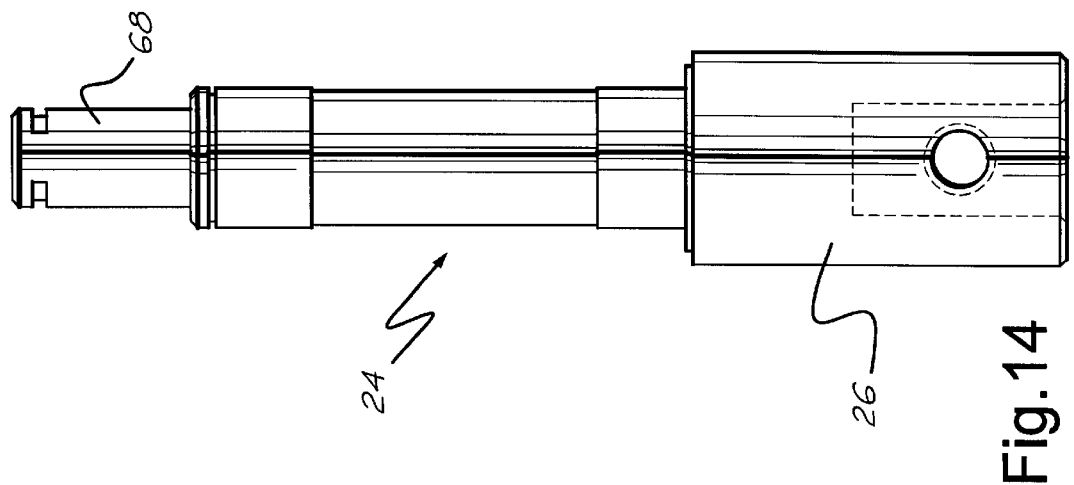
FIG. 14 is a side elevational view of the outer shaft.
Figure 13:
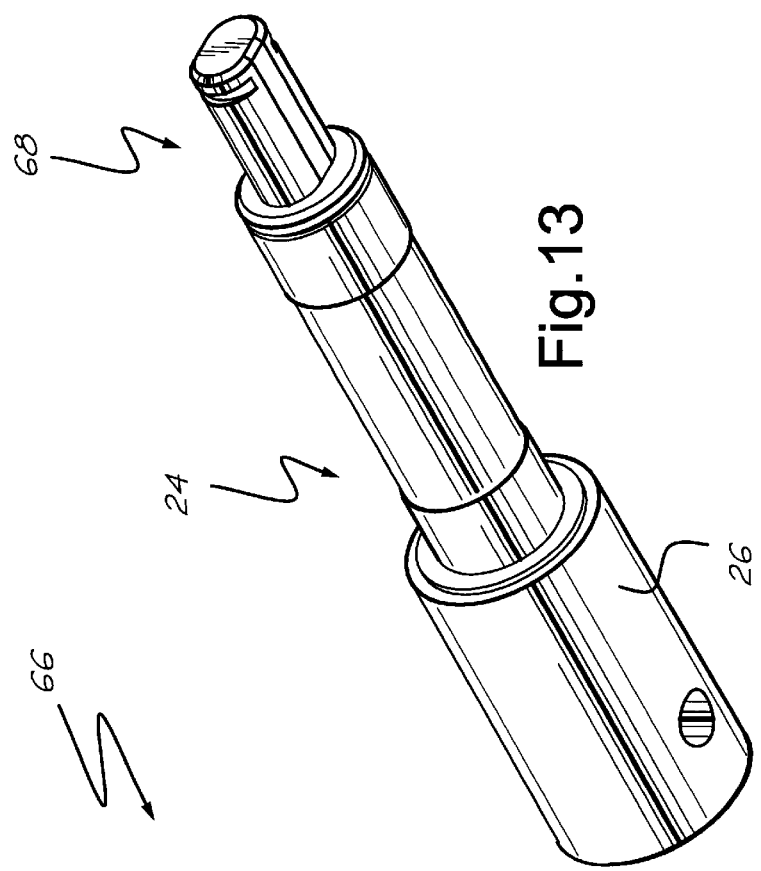
FIG. 13 is a perspective view of an outer shaft in accordance with the invention.
Figure 12:
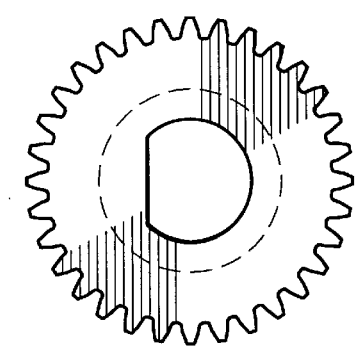
FIG. 12 is a drive gear for mounting to the center shaft.
Figure 15:
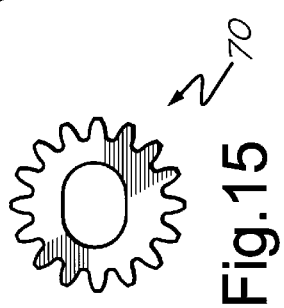
FIG. 15 is a driven gear for mounting to the outer shaft.

First and second outer shafts 24, 24' are also rotatably mounted in the drill body 20. An exemplary shaft 24 is shown in FIGS. 13–14. The outer shaft 24 has a first end 68 to which a gear 70 is mounted and a second end defining bushing 26 for receiving a suitable drill bit (not shown). Thus, by way of example, the bushings 26, 26' of the outer shafts 24, 24' fixedly engage boring bits for screws, e.g. 7/64" LH bits for screw on hinges; boring bits for Euro-screws, e.g., 5 mm CT LH (10 mm shank) boring bits for Euro screws; or boring bits for doweled hinges, e.g., 8 mm CT LH (10 mm diameter shank) boring bits, depending upon the hardware to be mounted to the workpiece. As can be seen in FIG. 2, a plurality of upper bearings 72, and a plurality of lower bearings are provided to rotatably support center shaft 22 and outer shafts 24, 24' in drill body 20, with drill body cover 60 completing the drill body assembly.

Figure 7:
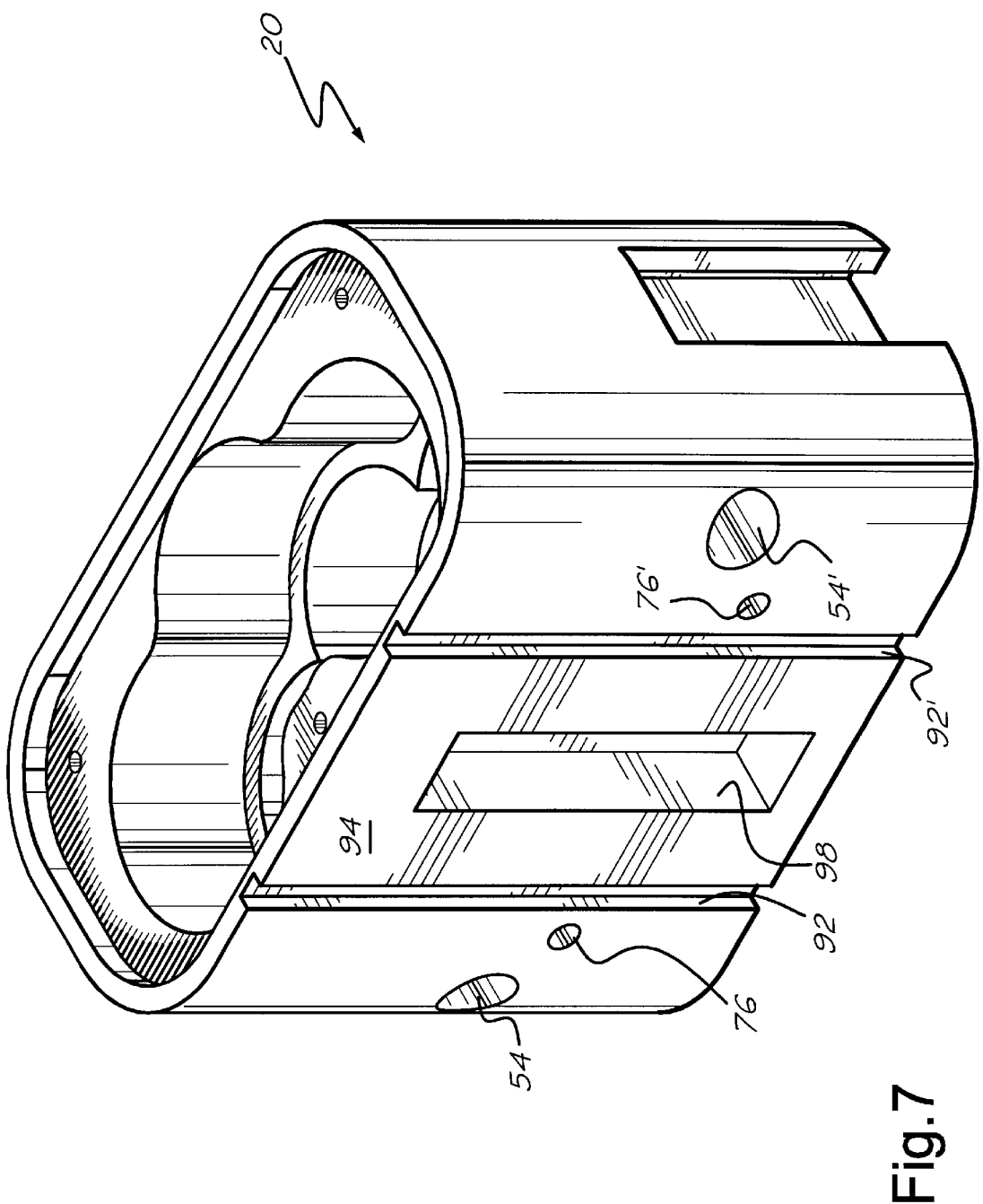
FIG. 7 is a perspective view of a drill body provided in accordance with the invention.
Figure 9:
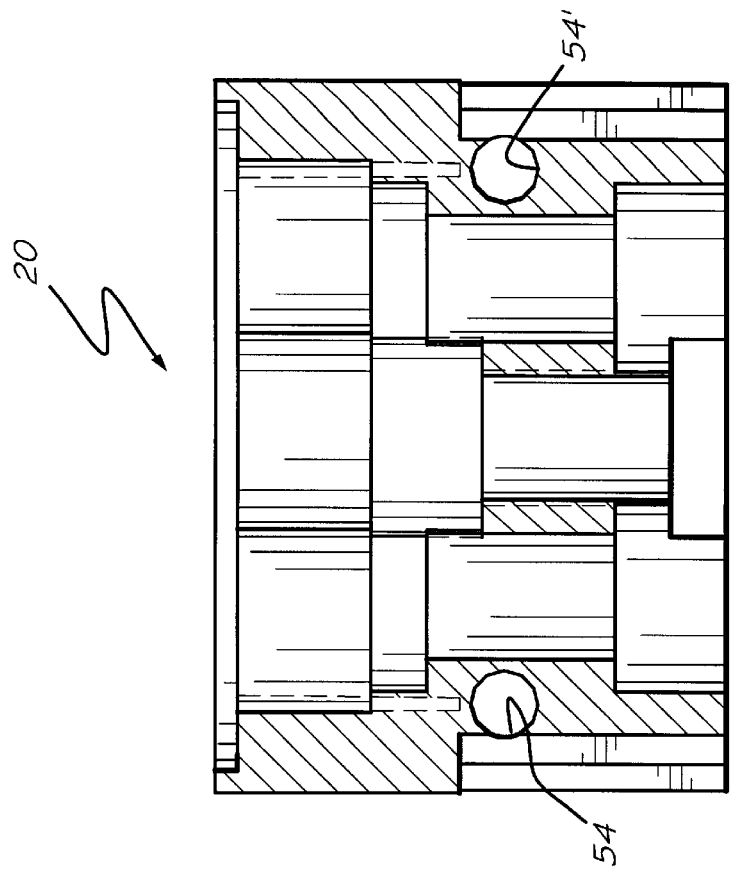
FIG. 9 is a cross-sectional view taken along line 9—9 of FIG. 8.
Figure 8:
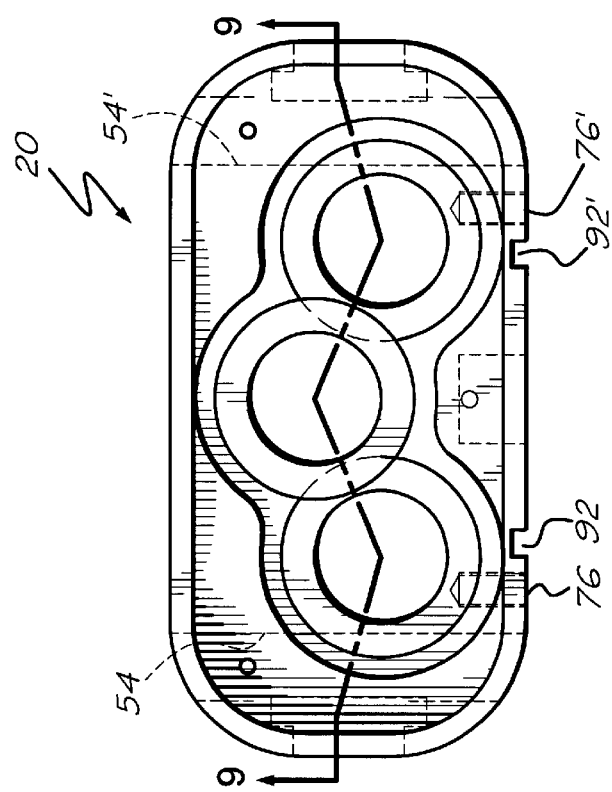
FIG. 8 is a top plan view of the drill body of FIG. 7.
Figure 11:
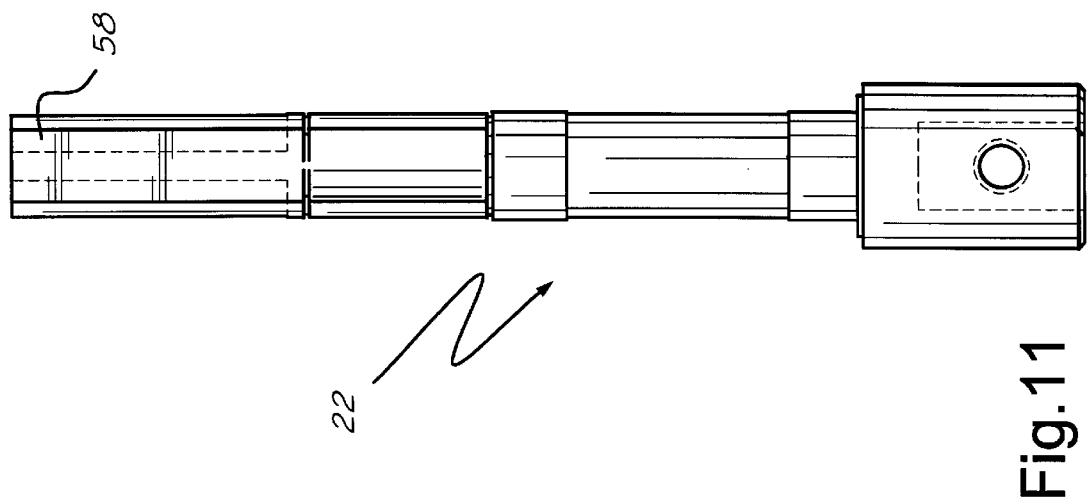
FIG. 11 is an elevational view of the center shaft.
Figure 10:
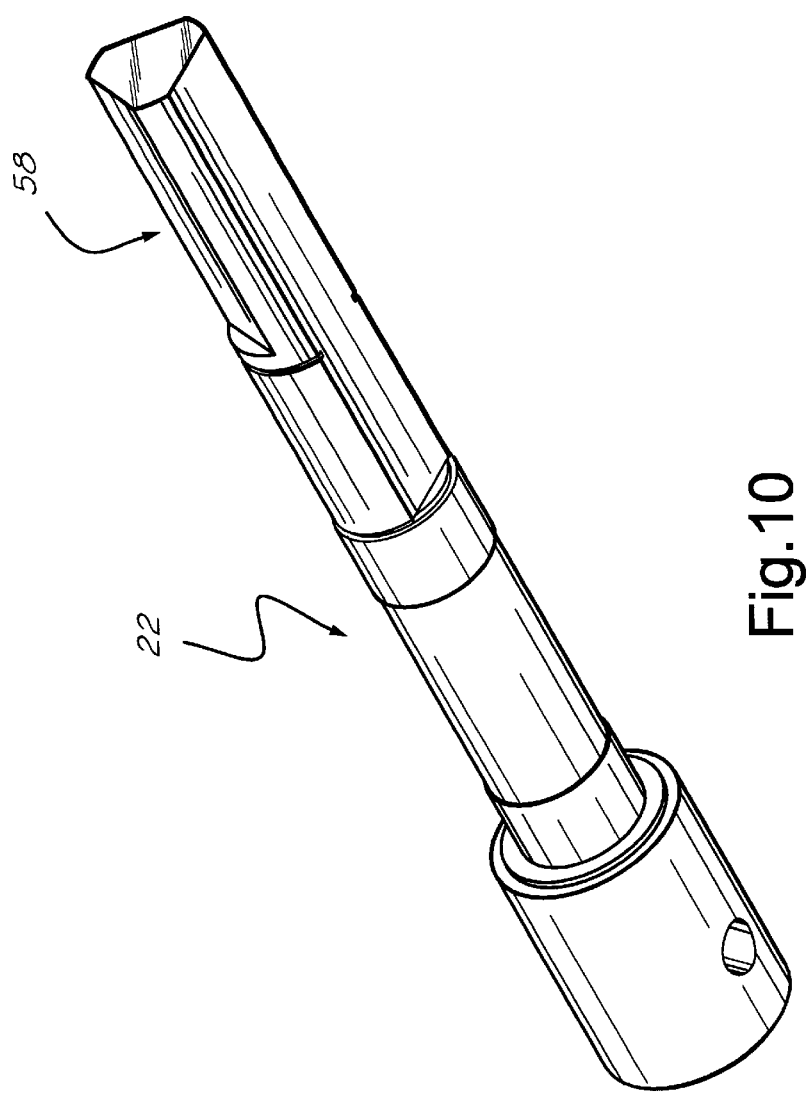
FIG. 10 is a perspective view of a center shaft for the drill body of the invention.
Figure 17:
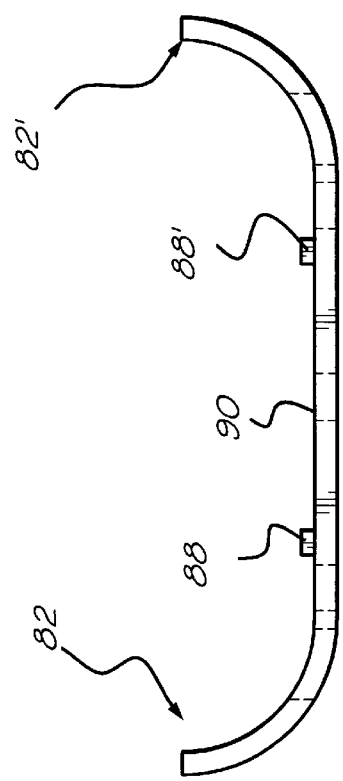
FIG. 17 is a top plan view of the safety chip guard/stop of FIG. 16.
Figure 16:
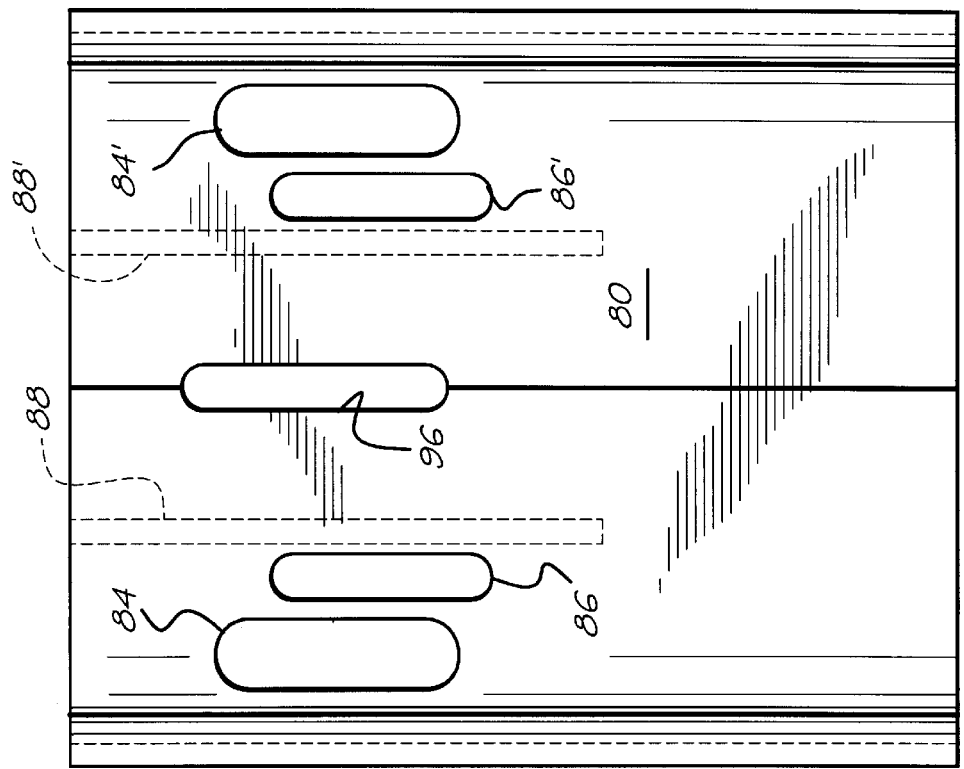
FIG. 16 is a front elevational view of a safety chip guard/stop provided in accordance with the invention.

As can also be seen in FIG. 7, first and second bores 76, 76' are further defined in the front face of the drill body. These bores 76, 76' are provided for respectively receiving slide guide screws (not shown) for guiding the safety chip guard/stop 28 and maintaining the same in close proximity to the drill body 20, as discussed hereinbelow, Referring now to particulars of the safety chip guard/stop 28 shown in FIGS. 16 and 17, in the illustrated embodiment the guard 28 has a generally flat major portion 80 and gently curved longitudinal side edges 82, 82' that generally follow the contour of the drill body 20. A pair of slots 84, 84' are defined adjacent the side edges 82, 82' of the chip guard/stop 28 for slidably receiving the stabilizer bars 18, 18'. Next to the stabilizer bar slots 84, 84', a further pair of slots 86, 86' are defined for receiving the side guide screws (not shown) which threadably engage bores 76, 76' in the drill body 20. Adjacent the slots 86, 86', first and second longitudinal flanges 88, 88' project from the rear face 90 of the chip guard/stop 28. Those flanges are adapted to slide in corresponding longitudinal grooves 92, 92' in the front face 94 of the drill body 20. Finally, a centrally disposed slot 96 is defined in the chip guard/stop, aligned with receptacle 98 in the front face 94 of drill body 20. By way of example, a spring and nut (not shown) are nested in the groove 98 and a knob (not shown) passes from the outside through the slot 96 in the guard 28 to the nut. This sets the guard 28 sandwiched between the knob and nut. As the guard is pushed up during drilling, the nut pushes against the spring until the spring reaches its stack height, which stops the guard, thus, determining the drill depth. When drilling ceases and the drilling head is shifted up, the spring loaded nut/knob urges the guard 28 to its fully deployed position (FIG. 1).

The drill attachment 10 of the invention may be attached to a conventional drill press and put into use as follows. The drill post brace arm 30 is displaced longitudinally relative to the support bracket body 32 so that the clamping bracket 14 can receive the drill post 34 of the drill press between the wheel 36 of the brace arm 30 and the wheels 38, 40 of the support bracket body 32. The brace arm 30 is then again displaced relative to the support bracket body 32 to snugly engage the drill post 34 and the set screw (not shown) is tightened so as to clamp the clamping bracket 14 to the drill post 34 while allowing the clamping bracket 14 to roll smoothly up and down the drill support post. The attachment 10 is then displaced vertically upwardly along the drill post so that the insert end 58 of the center shaft 22 is received in the chuck 62 of the drill press. If necessary, the drilling head 12 can be displaced along the stabilizer bars 18, 18' to be properly disposed relative to the chuck. In an exemplary embodiment, set screws for securing the drill body 20 to the stabilizer bars 18, 18' are provided in the drill body (either in the side walls of the drill body or projecting upwardly from the bottom face of the drill body). Thus, the stabilizer bar set screws can be loosened, the drill body 20 displaced as necessary to align the center shaft 22 with the drill press chuck 62, and the set screws tightened for the drill body 20 to be held in the thus selected position along the stabilizer bars 18, 18'. Suitable boring bits are then selected for the center shaft and each of the outer shafts. In an exemplary embodiment, a 35 mm×57 mm CT (10 mm diameter shank) boring bit is coupled to the bushing of the center shank 22 and, depending upon the hinge to be mounted to the workpiece, either a pair of bits for screw on hinges, a pair of boring bits for Euro-screws, or a pair of boring bits for doweled hinges are fixedly secured to the bushings 26, 26' of the outer shafts 20 24, 24'. The safety chip guard/stop 28 can be used simply as a chip guard and/or as a stop to determine the boring depth of the boring bits. The drill press with drilling attachment is now ready to use.

The drill press is then actuated to rotate the center shaft 22. The gears disposed in the drill body translates the rotation of the center shaft to simultaneous rotation of the outer shafts and the boring bits attached thereto (in the opposite direction). If same direction rotation is desired, further gears can be disposed intermediate the drive gear and driven gears. Also, although sun gears are shown, other gear combinations and configurations, i.e., worm gears, may be incorporated in the drive train.

The drilling head 12 is then displaced relative to the workpiece until a desired bore depth has been drilled. The drill press is then returned to its start position, out engagement with the workpiece. Thus, the drilling attachment of the invention has simultaneously drilled all bores necessary for the attachment of a hardware component, a Euro-hinge in the described embodiment, to a workpiece.

While the invention has been described in connection with what is presently considered to be the most practical and preferred embodiment, it is to be understood that the invention is not to be limited to the disclosed embodiments, but on the contrary, is intended to cover various modifications and equivalent arrangements included within the spirit and scope of the appended claims.

What is claimed is:

1. A drilling head for simultaneously drilling a plurality of holes in a workpiece comprising:

a drill body having a first bore defined vertically therethrough;

a first shaft rotatably disposed in said first bore, a first longitudinal end of said first shaft being configured for being clampingly engaged by a chuck of a drilling machine and a second longitudinal end of said center shaft defining a bushing for receiving a drill bit;

a second bore defined vertically through at least a portion of said drill body, a second shaft rotatably disposed in said second bore, a longitudinal end of said shaft defining a bushing;

a gear train operatively coupled to each said shaft for translating rotation of said first shaft to rotation of said second shaft whereby the shafts are concurrently driven for a simultaneous drilling operation; and a clamping bracket operatively coupled to said drilling head for detachably engaging a post of a drilling machine for positioning said drilling head with respect thereto, said clamping bracket being selectively slidably mounted to said post so as to allow vertical displacement of said drilling head in parallel to said post.

2. A drilling head as in claim 1, further comprising a chip guard/stop element slidably mounted to an outer peripheral surface of said drill body.

3. A drilling head as in claim 1, wherein said clamping bracket is operatively coupled to said drilling head with first and second stabilizer bars.

4. A drilling head as in claim 1, wherein said clamping bracket comprises a brace arm and a support bracket body, said brace arm being selectively displaceable relative to said support bracket body to selectively clamp the post between said brace arm and support bracket body.

5. A drilling head as in claim 4, further comprising a locking screw for locking said brace arm relative to said support bracket body.

6. A drilling head as in claim 4, wherein said brace arm includes at least one roller wheel and said support bracket body includes first and second roller wheels for rolling engagement with the drill post.

7. A drilling head as in claim 3, wherein said stabilizer bars project through said drill body so as to extend outwardly from a front face of said drilling head.

8. A drilling head as in claim 2, wherein said clamping bracket is operatively coupled to said drilling head with first and second stabilizer bars.

9. A drilling head as in claim 8, wherein said stabilizer bars project through said drill body so as to extend outwardly from a front face of said drilling head.

10. A drilling head as in claim 9, wherein slots are defined in said chip guard/stop for receiving said stabilizer bars.

\* \* \* \* \*